(12) United States Patent
Sun et al.

(10) Patent No.: US 10,218,234 B2
(45) Date of Patent: Feb. 26, 2019

(54) ELECTRIC MOTOR WITH ASYMMETRIC DESIGN FOR IMPROVED OPERATION

(71) Applicant: Rockwell Automation Technologies, Inc., Mayfield Heights, OH (US)

(72) Inventors: Xikai Sun, Shanghai (CN); Kun Wei, Shanghai (CN); Gennadi Sizov, Shorewood, WI (US); Jingbo Liu, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 237 days.

(21) Appl. No.: 15/367,351

(22) Filed: Dec. 2, 2016

(65) Prior Publication Data

US 2018/0159392 A1 Jun. 7, 2018

(51) Int. Cl.
*H02K 1/27* (2006.01)
*H02K 1/08* (2006.01)
*H02K 21/16* (2006.01)

(52) U.S. Cl.
CPC .............. *H02K 1/276* (2013.01); *H02K 1/08* (2013.01); *H02K 1/2766* (2013.01); *H02K 21/16* (2013.01)

(58) Field of Classification Search
CPC ........ H02K 1/276; H02K 1/08; H02K 1/2766; H02K 21/16
See application file for complete search history.

(56) References Cited

U.S. PATENT DOCUMENTS

| | | | |
|---|---|---|---|
| 4,458,184 A | 7/1984 | Kawate | |
| 4,847,982 A * | 7/1989 | Morrill | H02K 3/28 29/596 |
| 5,107,159 A * | 4/1992 | Kordik | H02K 1/146 310/156.44 |
| 7,482,802 B2 | 1/2009 | Finkler et al. | |
| 8,227,953 B2 | 7/2012 | Suzuki et al. | |
| 8,536,748 B2 | 9/2013 | Liang et al. | |
| 8,860,276 B2 | 10/2014 | Takizawa | |
| 9,831,729 B2 * | 11/2017 | Kim | H02K 1/276 |
| 10,020,703 B2 * | 7/2018 | Lin | H02K 3/28 |
| 2010/0213781 A1 | 8/2010 | Rahman et al. | |
| 2012/0181960 A1 | 7/2012 | Kameyama | |
| 2013/0147299 A1 | 6/2013 | Rahman et al. | |

(Continued)

OTHER PUBLICATIONS

Yong-Cheol Kwon, and Seung-Ki Sul; Noor Aamir Baloch, Sohji Murakami, and Shinya Morimoto, Design and Control of IPMSM Sensorless Drive for Mechanical Rotor Position Detection Capability, Proceeding of IEEE ECCE 2013, Sep. 2013—(7) pages.

*Primary Examiner* — Emily P Pham
(74) *Attorney, Agent, or Firm* — Boyle Fredrickson, SC

(57) ABSTRACT

An electric motor in which at least one of the rotor and the stator has an asymmetric design is disclosed. The electric motor is divided into a number of segments, where each segment has an equal number of windings and an equal number of poles. The physical construction of each pole within a segment is identical and the number of turns of each winding within a segment is identical. The asymmetry is formed by varying the physical construction of the either the rotor or the stator within one segment from the corresponding construction of the rotor or stator in the other segments. The asymmetries are designed to improve one or more operating characteristics such as sensorless performance, torque ripple, or cogging torque in the motor.

20 Claims, 11 Drawing Sheets

(56) References Cited

U.S. PATENT DOCUMENTS

| | | |
|---|---|---|
| 2014/0246939 A1 | 9/2014 | Murakami et al. |
| 2014/0246940 A1 | 9/2014 | Murakami et al. |
| 2016/0276885 A1 | 9/2016 | Jurkovic et al. |
| 2017/0264178 A1* | 9/2017 | Stauder .................... H02K 3/18 |
| 2018/0091072 A1* | 3/2018 | Sun ......................... H02P 27/06 |
| 2018/0145565 A1* | 5/2018 | Pozmantir .............. H02K 21/16 |

* cited by examiner ic design and, more
ELECTRIC MOTOR WITH ASYMMETRIC DESIGN FOR IMPROVED OPERATION

BACKGROUND OF THE INVENTION

The subject matter disclosed herein relates generally to an electric motor having an asymmetric design and, more specifically, to a permanent magnet (PM) machine having a physical construction such that at least one of the rotor and the stator has an asymmetric design.

PM motors include a set of magnets in the rotor. The magnets are either inserted in slots within the rotor (i.e., interior permanent magnets) or mounted to the outer surface of the rotor (i.e., surface permanent magnets). The magnets are configured such that the magnetic field varies in strength at different locations around the rotor. The magnets may be, for example, shaped such that more magnetic material exists in a central area of the magnet and less magnetic material exists toward the edge of the magnet or inserted within the rotor such that a portion of the magnet is further from the surface of the rotor. The magnetic field produced by the permanent magnets interacts with the field generated by a stator current to control rotation of the motor.

In a PM motor, various numbers of slots and windings are present in the stator and various numbers of poles are present in the rotor. The slots and windings may belong to a single phase or may be divided among multiple phases (e.g., 3 phases). In a multiple phase PM motor, one winding for each phase is wound around successive teeth establishing one set of phase windings. Additional sets of phase windings are then repeated around the stator. The poles typically alternate between north and south poles around the rotor. A single electrical cycle applied to the stator causes the rotor to rotate an angular distance equivalent to the span of one set of phase windings.

Typically, it is desirable to manufacture PM motors with a symmetric construction. With a symmetric construction, each set of phase windings is identical and each of the north or south poles in the rotor is identical. As a result of the symmetry, the PM motor exhibits uniform performance as the rotor passes each set of phase windings. Historically, symmetry has been desirable to provide uniform operation, or at least periodic operation, as each pole pair passes one set of phase windings, through one revolution of the PM motor. This uniform or periodic operation helps provide uniform wear of moving parts, bearing elements, and the like within the PM motor.

However, this uniform performance through one revolution of the PM motor is not without certain drawbacks. Numerous techniques for determining angular position of the rotor without use of a position sensor have been developed. However, because performance of the motor is periodic as the rotor passes each set of phase windings, the angular position may only be determined with respect to one set of phase windings. These sensorless techniques for determining angular position do not provide absolute mechanical position of the rotor. If, for example, the stator has nine windings, the rotor may be in any one of three different positions.

It is also known that a certain amount of torque ripple may be present in a PM motor. Although the poles are constructed such that the magnetic field varies in strength across the angular span of the pole, the variation is not sinusoidal and may include a torque ripple, or periodic variation, across the span of each pole. Although symmetric construction of the PM motor may result in uniform wear and uniform or periodic operation of the PM motor, symmetric construction may result in a greater amplitude of torque ripple than desired.

Thus, it would be desirable to provide a PM motor having one or more asymmetries to improve one or more operating characteristics of the PM motor.

BRIEF DESCRIPTION OF THE INVENTION

The subject matter disclosed herein describes an electric motor in which at least one of the rotor and the stator has an asymmetric design. Although it is common to design motors with a symmetrical construction such that uniform, or at least periodic, operation occurs within one revolution of the motor, the inventors have identified a number of asymmetries that may be utilized in the construction of the electric motor to improve operation of the motor. The asymmetries are designed to improve one or more operating characteristics, including, but not limited to sensorless performance, torque ripple, or cogging torque. Further, the asymmetries may also reduce the cost of the electric motor.

An exemplary embodiment of an interior permanent magnet (IPM) motor follows. However, this discussion is not intended to be limiting and certain asymmetries may be equally applicable, for example, to a surface permanent magnet motor or to stator windings of other electric motors, such as an induction motor, a separately wound motor, and a synchronous motor. The IPM includes a multi-phase, multi-slot stator. For purposes of illustration, the stator is a three-phase stator, having twelve slots. The IPM also includes a multi-pole rotor. For purposes of illustration, the rotor is an eight pole rotor. The IPM may be divided into a number of sections based on the number of phases, slots, and poles. According to the exemplary embodiment, the motor may be divided into four sections, where each section includes three slots and two poles. Consequently, each section spans ninety degrees of the motor. Each phase of the stator is wound about one tooth located between slots and the three slots of each section are configured such that three teeth are present within each segment. In other words, each segment begins at a center line of a slot, extends across one half slot, two full slots, and a second half slot.

Both the rotor and the stator may include asymmetries to improve performance of the IPM motor. The rotor is designed such that at least one of the pole pairs within one segment is different than the other pole pairs. The differences may include, for example, the configuration of magnets inserted into the rotor. The magnets may be arranged in a "v"-shape, curved to follow the curvature of the rotor, or linear adjacent to the outer surface of the rotor. The size or shape of the magnets may vary. The stator may also be designed such that at least one set of windings, teeth, and/or slots within one segment differs from the windings, teeth, and/or slots of the other segments. For example, the tooth tips or slot openings may vary. Optionally, the number of turns of a winding may vary. However, according to a preferred embodiment, each of the phases within one segment is the same as the other phases within the segment. The asymmetry in the stator is from one segment with respect to the other segments.

According to one embodiment of the invention, a permanent magnet machine includes a stator having multiple windings and a rotor having multiple poles. Each winding includes multiple turns of an electrical conductor, and each pole includes a magnetic structure operable to interact with a current conducted in the windings to cause rotation of the rotor. Multiple segments are defined within the permanent magnet machine, where each segment is defined from a center axis of the permanent magnet machine to an outer periphery of the permanent magnet machine and spans an angular distance around the permanent magnet machine equal to an angular distance spanned by each of the other segments. An equal number of windings and an equal number of poles are located within each of the segments. Each winding within one of the segments has an equal number of turns as the other windings within the corresponding segment, and a physical construction of each pole within one of the segments is the same as a physical construction of the other poles within the corresponding segment. The permanent magnet machine also includes a first asymmetry located in the rotor and a second asymmetry located in one of the plurality segments of the stator. The first asymmetry is defined by the physical construction of each pole in one of the plurality of segments being different than the physical construction of the poles in the other segments.

According to another embodiment of the invention, a permanent magnet machine includes a stator having a plurality of windings and a rotor having a plurality of poles. Multiple segments are defined within the permanent magnet machine, where the number of segments is equal to the greatest common divisor between the number of windings in the stator and the number of poles in the rotor. Each winding within one of the segments is the same as the other windings within the corresponding segment, and each of the poles within one of the segments has the same physical construction as the other poles within the corresponding segment. A first asymmetry is located in the rotor, and a second asymmetry is located in the stator. Each of the windings within one of the segments is identical, and each of the windings within a first segment is different than each of the windings in the other segments. The second asymmetry is defined by the difference in the windings between the first segment and the other windings in the other segments.

According to still another embodiment of the invention, a permanent magnet machine includes a stator having a plurality of windings and a rotor having a plurality of poles. Multiple segments are defined within the permanent magnet machine, where the number of segments is equal to the greatest common divisor between the number of windings in the stator and the number of poles in the rotor. Each winding within one of the segments is the same as the other windings within the corresponding segment, and each of the poles within one of the segments has the same physical construction as the other poles within the corresponding segment. An asymmetry is located in the rotor, where the physical construction of the poles within a first segment is different than the physical construction of the poles in each of the other segments and the asymmetry is defined by the different physical construction.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
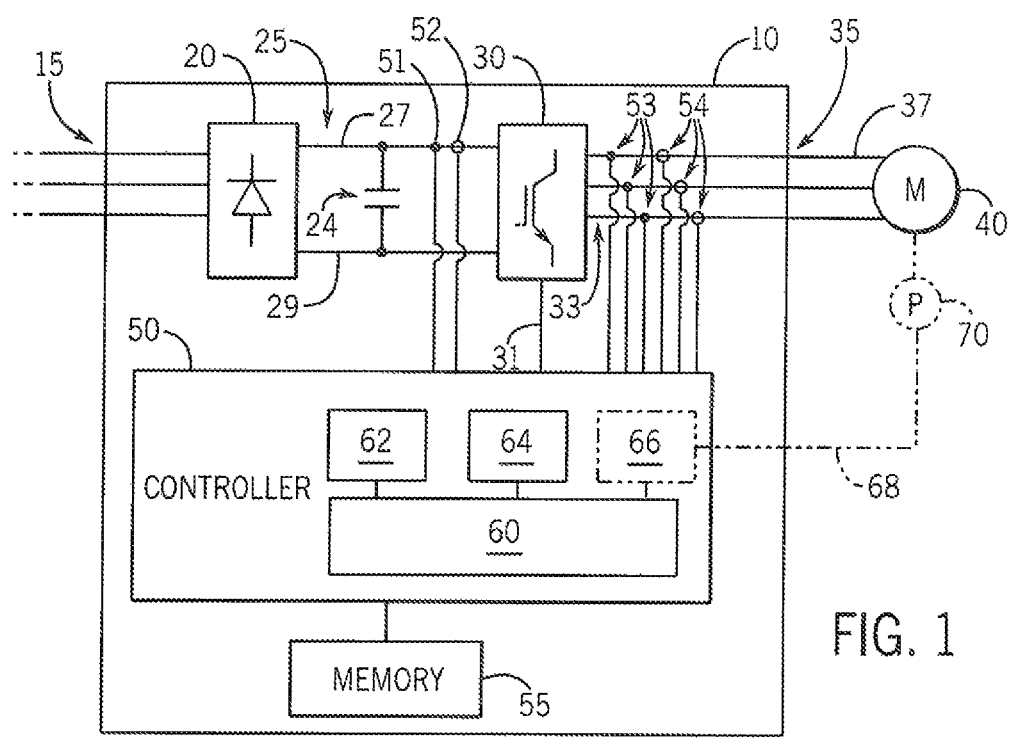
FIG. 1 is a partial schematic representation of an exemplary motor drive and motor incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an exemplary motor drive 10 operative to control a permanent magnet (PM) motor is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. The rectifier section 20 may include, for example, a set of diodes forming a diode bridge that rectifies the three-phase AC voltage to a DC voltage on a DC bus 25. Optionally, the rectifier section 20 may include other solid state devices including, but not limited to, thyristors, silicon controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

The DC bus 25 is connected in series between the rectifier section 20 and an inverter section 30. The inverter section 30 consists of switching elements, such as transistors, thyristors, or SCRs as is known in the art. According to one embodiment of the invention, the inverter section 30 includes an insulated gate bipolar transistor (IGBT) and a free-wheeling diode connected in pairs between the positive rail 27 and each phase of the output voltage as well as between the negative rail 29 and each phase of the output voltage. Each of the IGBTs receives gating signals 31 to selectively enable the transistors and to convert the DC voltage from the DC bus 25 into a controlled three phase output voltage to the motor 40. When enabled, each transistor connects the respective rail 27, 29 of the DC bus 25 to an electrical conductor 33 connected between the transistor and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable 37 including electrical conductors connected to each of the output terminals 35.

A controller 50 includes multiple modules (60-66) and manages execution of the modules to achieve a desired operation of the motor 40. One or more modules (60-66) are used to control operation of the motor drive 10. The modules may include, but are not limited to, a current regulator, a voltage regulator, a feedback module, a position regulator, or a modulation module. The illustrated embodiment is not intended to be limiting and it is understood that various features of each module discussed herein may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 55 in communication with the controller 50. The memory device 55 may include transitory memory, non-transitory memory or a combination thereof. The memory device 55 may be configured to store data and programs, which include a series of instructions executable by the controller 50. It is contemplated that the memory device 55 may be a single device, multiple devices, or incorporated, for example, as a portion of another device such as an application specific integrated circuit (ASIC). The controller 50 is in communication with the memory 55 to read the instructions and data as required to control operation of the motor drive 10.

The controller 50 also receives feedback signals indicating the current operation of the motor drive 10. The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive. The controller 50 includes components required to convert the signals, such as analog to digital (A/D) converters, buffers, amplifiers, and any other components that would be necessary to convert a feedback signal in a first format to a signal in a second format suitable for use by the controller 50 as would be understood in the art.

Figure 2:
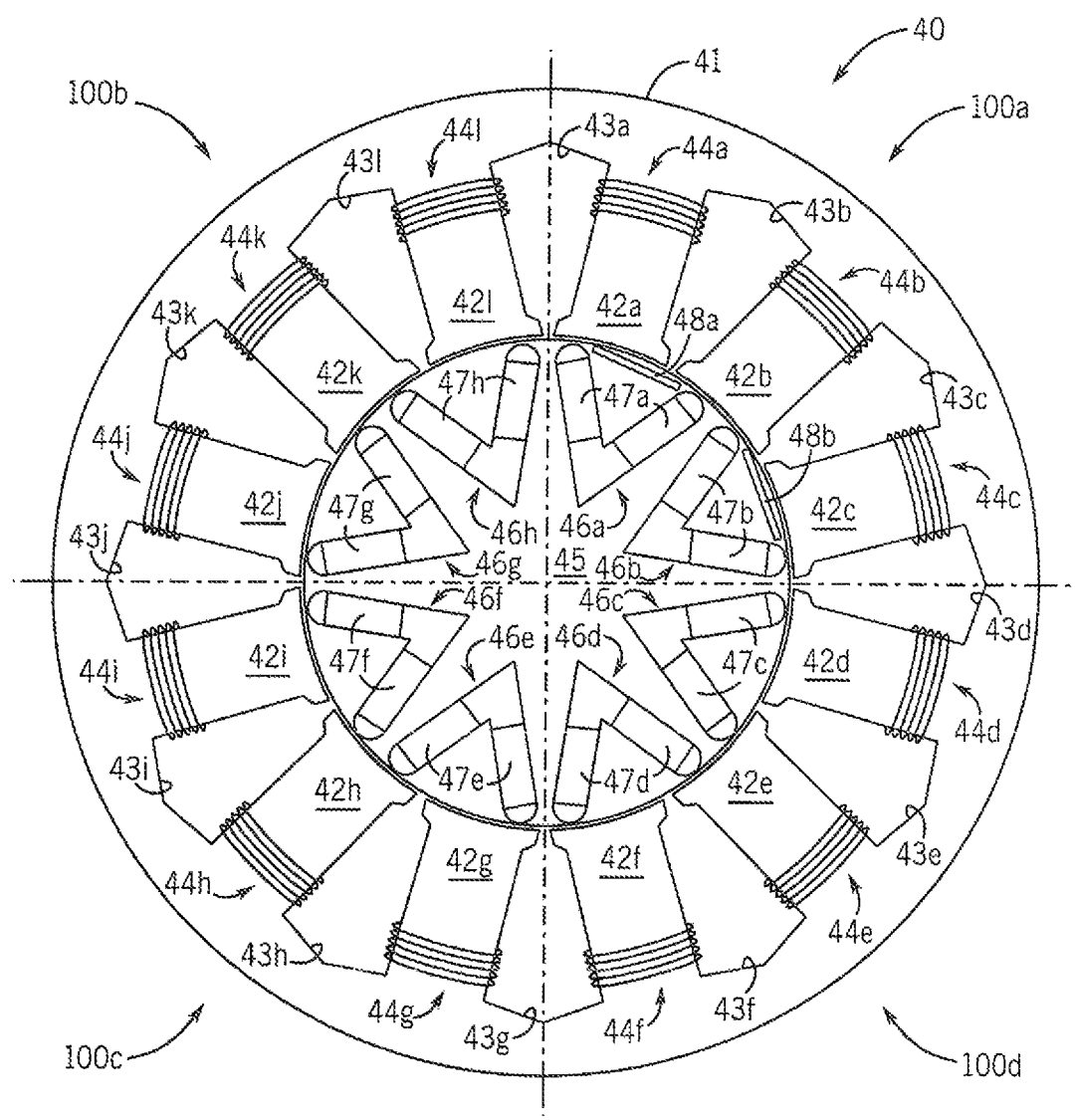
FIG. 2 is a sectional view of a motor according to one embodiment of the invention illustrating an asymmetry in a magnetic structure of the rotor.
Figure 3:
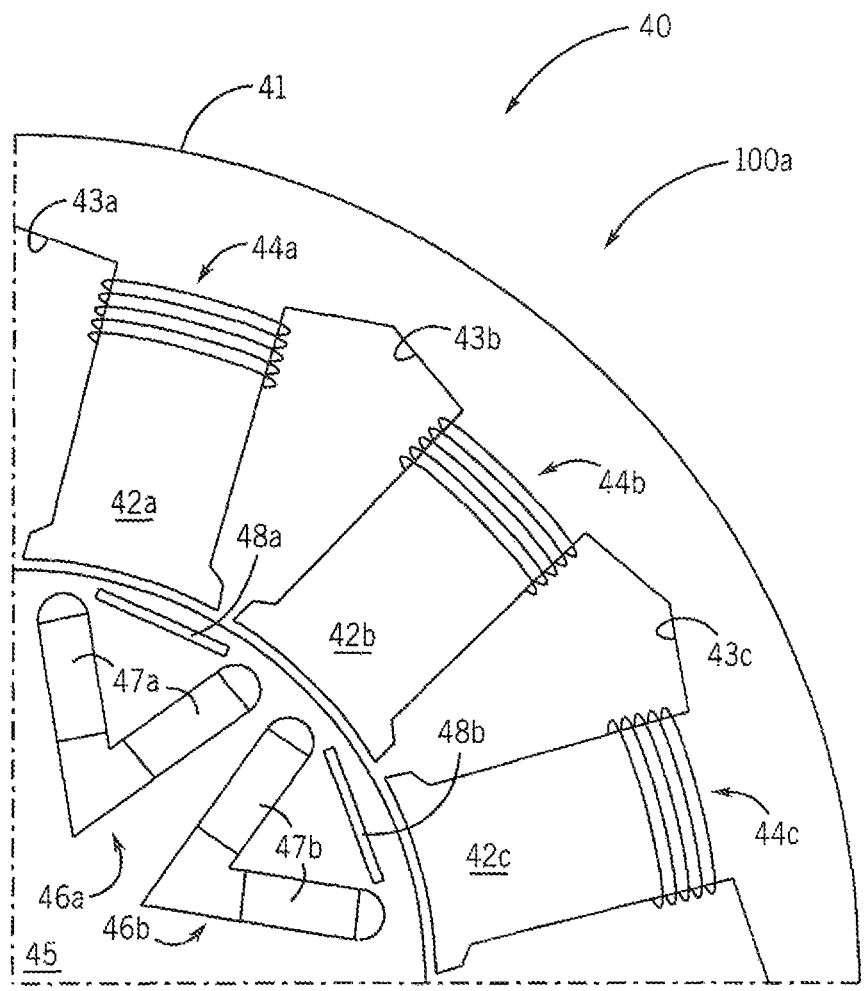
FIG. 3 is a partial sectional view of the motor of FIG. 2.

Turning next to FIGS. 2 and 3, one embodiment of the PM motor 40 controlled by the motor drive 10 is illustrated. The PM motor 40 includes a rotor 45 having a number of poles 46 and a stator 41 having a number of windings 44. The PM motor 40 is divided into a number of segments 100 as a function of the number of windings 44 and number of poles 46 in the PM motor 40. According to the illustrated embodiment, the PM motor 40 includes twelve windings 44a-44l and eight poles 46a-46h. The number of segments 100 into which the PM motor 40 is divided is determined such that an equal number of windings and an equal number of poles is present in each segment 100. Preferably, the number of segments is selected as the greatest common divisor between the number of windings, or slots, in the stator and the number of poles in the rotor. The illustrated embodiment includes four segments 100a-100d, where each segment 100a-100d includes three windings 44 and two poles 46. As is understood in the art, each winding 44 is wound around a tooth 42 with the windings filling slots 43 between adjacent teeth 42. Each winding 44 consists of a number of turns, N, wrapped around the tooth 42. Each pole 46 includes a v-shaped slot in which a pair of magnets 47 is inserted, where one magnet of the pair is inserted into each leg of the v-shaped slot.

As previously indicated, the PM motor 40 is constructed such that the rotor 45, the stator 41, or both the rotor and stator has an asymmetry in their construction. In the illustrated embodiment, the first segment 100a includes an asymmetry in the rotor 45. Each pole 46 in the first segment 100a includes a secondary magnet 48 in addition to the primary magnet 47. A second, straight slot spans between the upper ends of each leg of the v-shaped slot, and the secondary magnet 48 is inserted into the straight slot, resulting in a different magnetic field generated within the first segment 100a than is generated within each of the other segments 100b-100d.

It is further contemplated that both the rotor 45 and the stator 41 may include an asymmetry. In the illustrated embodiment, the number of turns, N, for the windings in one segment 100 may be different than the number of turns for the windings in the other segments. For example, the number of turns for each winding 44a-44c in the first segment 100a may be a first number of turns, N1, while the number of turns for each winding 44d-44l in each of the other segments 100b-100d may be a second number of turns, N2. According to another embodiment, the number of turns for the windings in each segment may be different than the number in other segments. The first segment 100a includes windings 44a, 44b, 44c that each have a first number of turns, N1. The second segment 100b includes windings 44d, 44e, 44f that each have a second number of turns, N2. The third segment 100c includes windings 44g, 44h, 44i that each have a third number of turns, N3. The fourth segment 100d includes windings 44j, 44k, 44l that each have a fourth number of turns, N4. The first number of turns, N1; second number of turns, N2; third number of turns, N3; and the fourth number of turns, N4 are each different.

Figure 4:
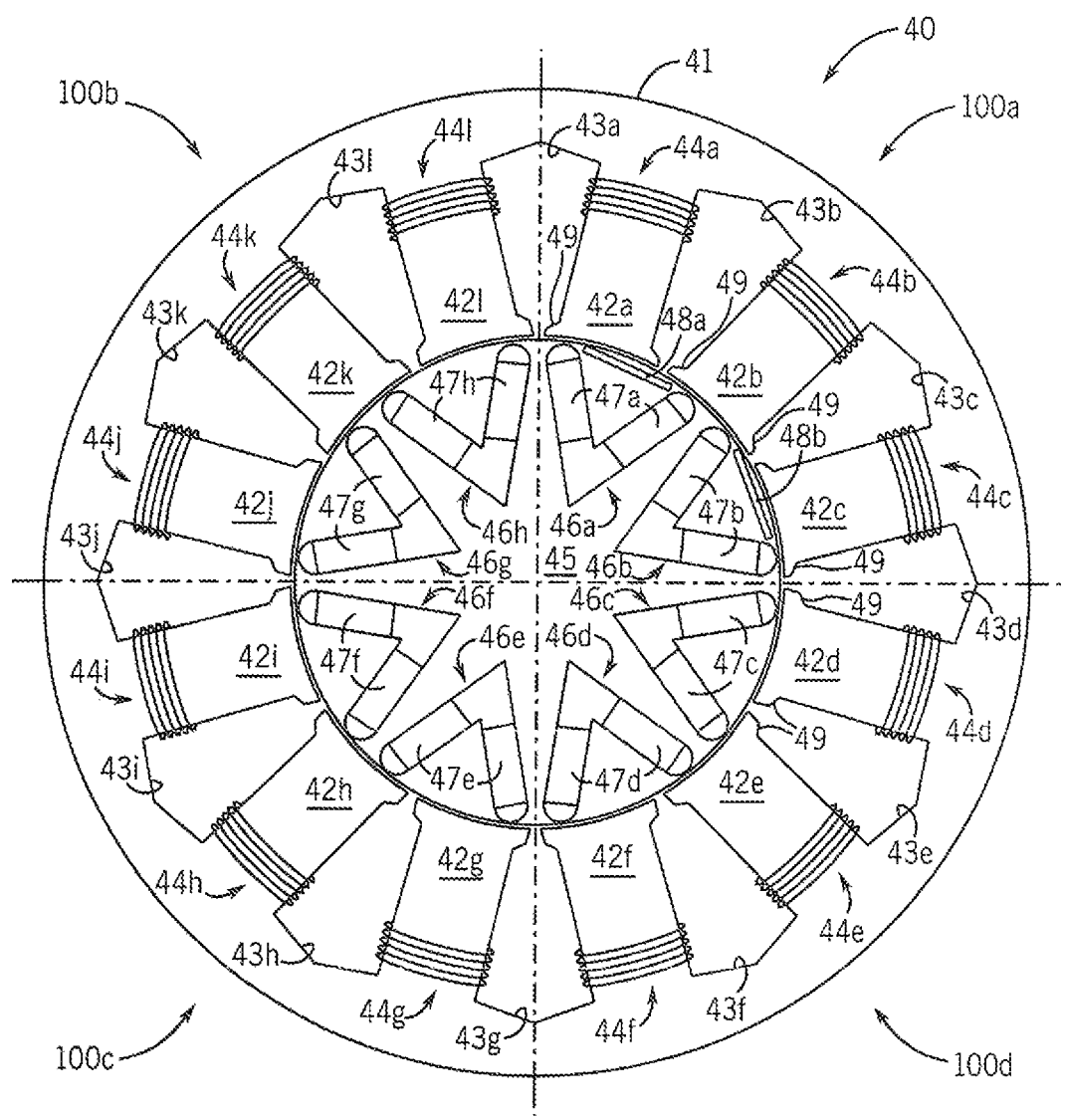
FIG. 4 is a sectional view of a motor according to one embodiment of the invention illustrating an asymmetry in the magnetic structure of the rotor and an asymmetry in a slot opening of the stator.
Figure 5:
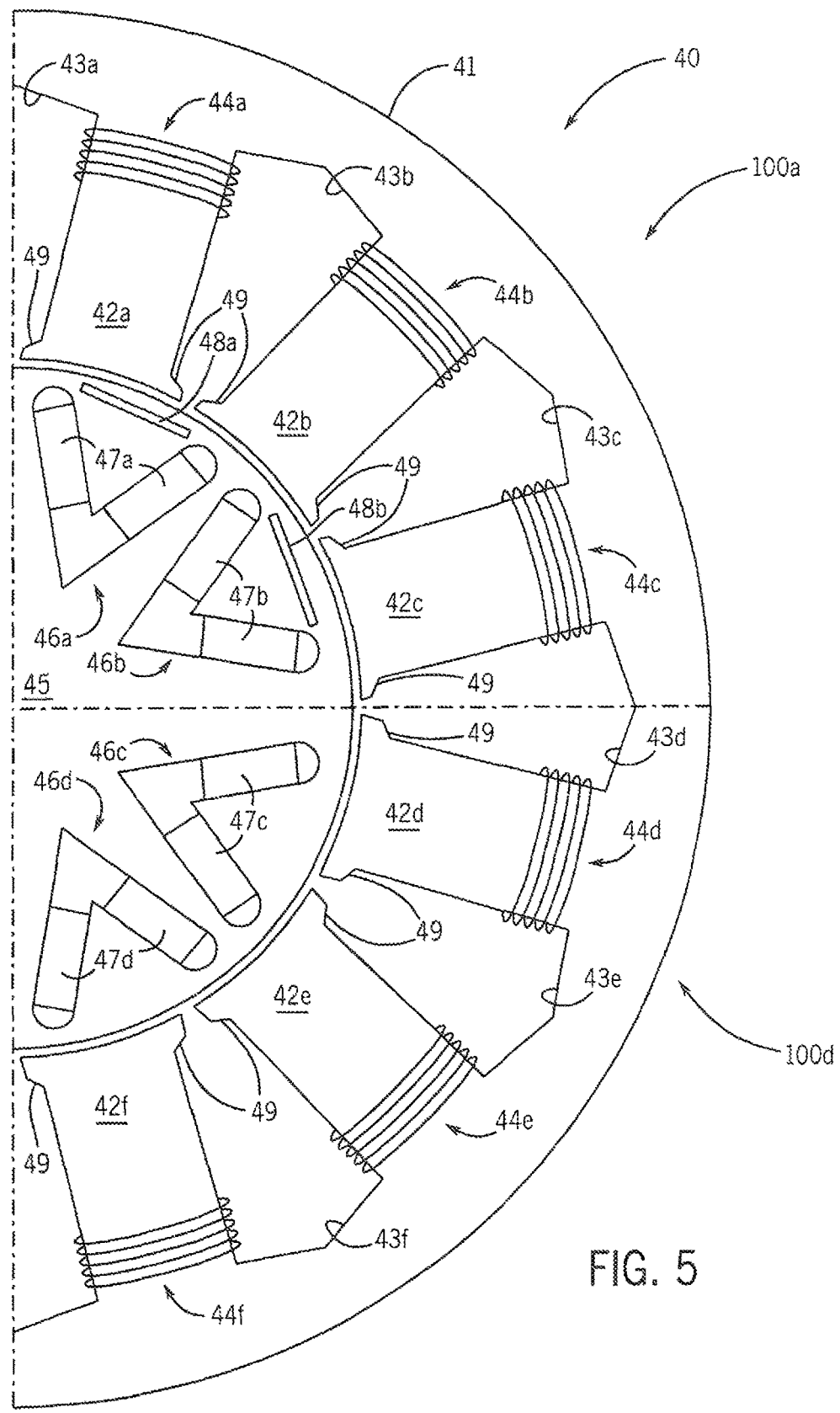
FIG. 5 is a partial sectional view of the motor of FIG. 4.

Turning next to FIGS. 4 and 5, the asymmetry in the stator may be a variation in the slot opening. In this illustrated embodiment, the construction of the poles 46 in the rotor 45 are as described above with respect to FIGS. 2 and 3. However, the shape of each slot 43 in the first segment 100a is different than the shape of each slot 43 in the other segments 100b-100d. Specifically, the shape of the tooth tip 49 in the first segment 100a is different than the shape of the tooth tips 49 in the other segments 100b-100d. As with the windings 44 discusses above, it is contemplated that the shape of the slot opening in each segment 100 may be different than the shape of other segments. The shape of the tooth tip 49 may vary between segments 100 or the shape of the tooth 42 itself may vary such that the width or length of the slot 43 varies in each segment 100. However, each slot 43 in one segment 100 will remain the same as the other slots in the same segment.

Figure 6:
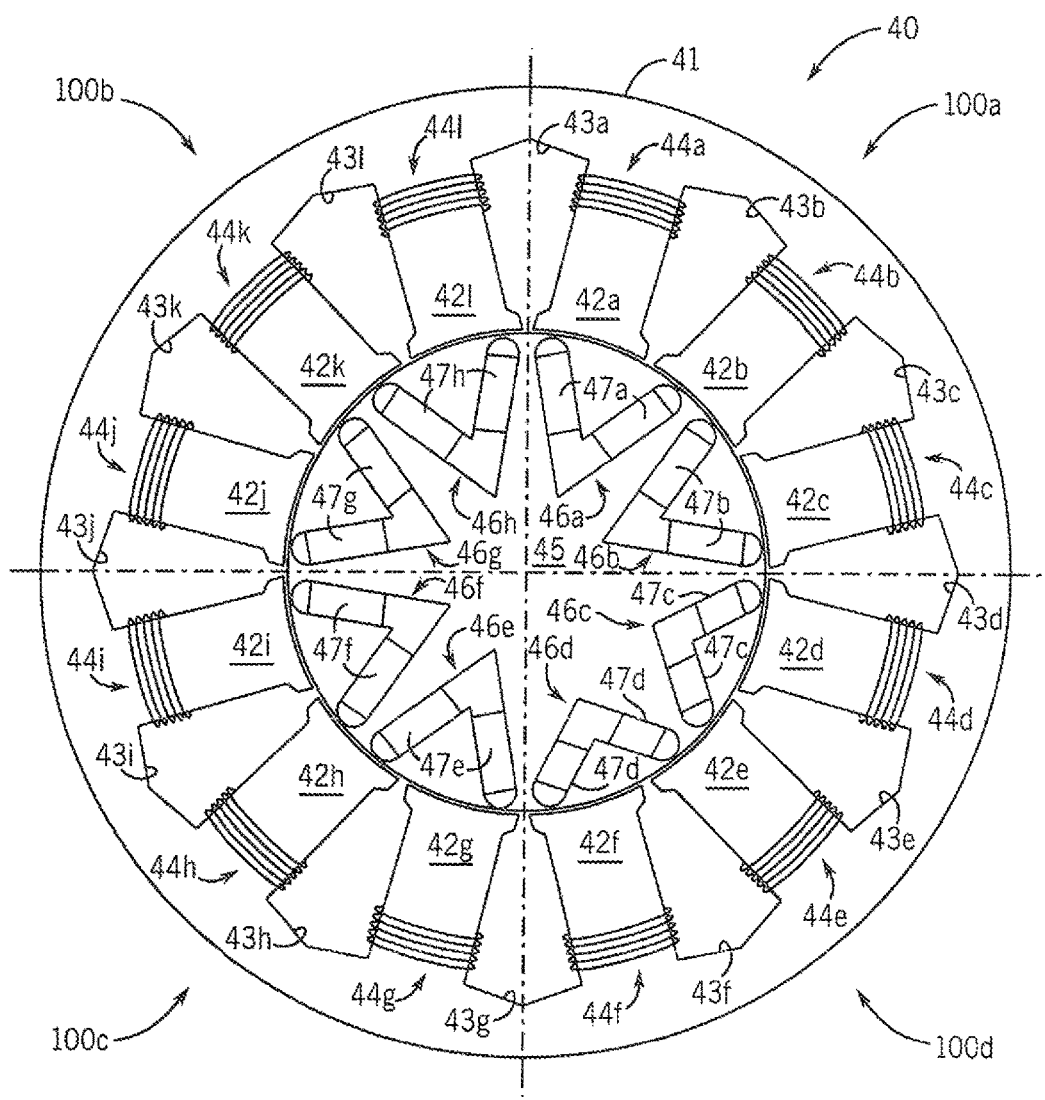
FIG. 6 is a sectional view of a motor according to one embodiment of the invention illustrating an asymmetry in the physical layout of the poles of the rotor.
Figure 7:
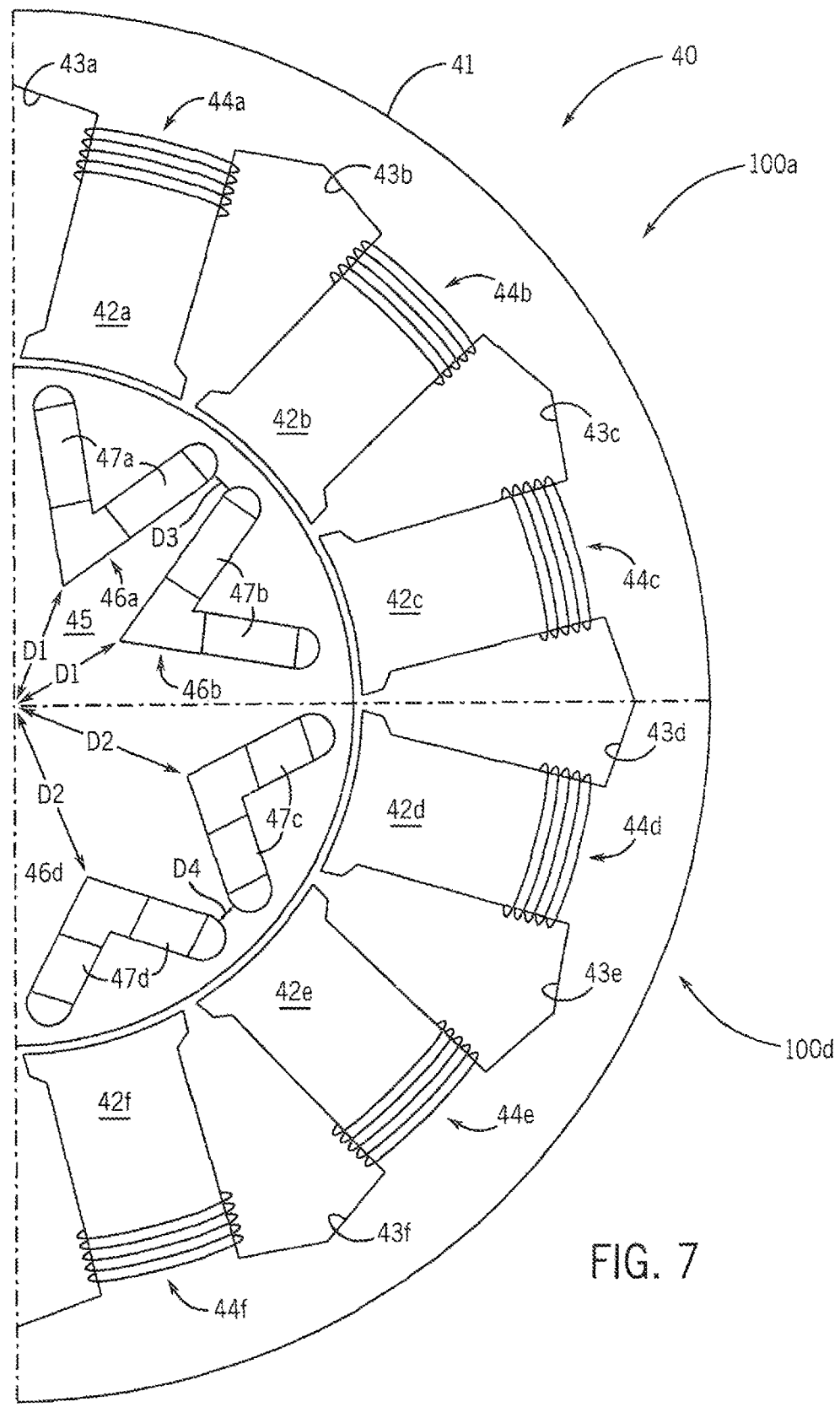
FIG. 7 is a partial sectional view of the motor of FIG. 6.

It is contemplated that the asymmetry in the rotor may take various other forms. Turning next to FIGS. 6 and 7, another embodiment of the PM motor 40 controlled by the motor drive 10 is illustrated. Similar to the embodiment discussed above, the PM motor 40 includes a rotor 45 having a number of poles 46 and a stator 41 having a number of windings 44. The PM motor 40 is divided into a number of segments 100 as a function of the number of windings 44 and number of poles 46 in the PM motor 40. According to the illustrated embodiment, the PM motor 40 includes twelve windings 44a-44l, eight poles 46a-46h, and is divided into four segments 100a-100d, where each segment 100a-100d includes three windings 44 and two poles 46. Each pole 46 includes a v-shaped slot in which a pair of magnets 47 is inserted, where one magnet of the pair is inserted into each leg of the v-shaped slot.

The asymmetry in the rotor 45 is defined by a variation in the construction of the v-shaped slot for one of the segments 100. For each pole 46, a first distance is defined between the center axis of the rotor 45 and the point of the "v" forming the slot. A second distance is defined between adjacent tips of the v-shaped slot. According to the illustrated embodiment, the v-shaped slot in the fourth segment 100d is different than the v-shaped slots in the other segments 100a-100c. A first distance, D1, is defined between the center axis of the rotor 45 and the tip of each v-shaped slot 46 in the other segments 100a-100c, and a second distance, D2, is defined between the center axis of the rotor 45 and the tip of each v-shaped slot 46 in the fourth segment 100d. A third distance, D3, is defined between the tips of adjacent poles 46 in the other segments 100a-100c, and a fourth distance, D4, is defined between the tips of adjacent poles 46 in the fourth segment 100d. The interaction of each pole 46 with the current in the stator windings of the fourth segment changes from the interaction of each pole 46 with the current in the stator windings of the other segments as the second distance, D2, is varied from the first distance, D1, and as the fourth distance, D4, is varied from the third distance, D3.

Figure 8:
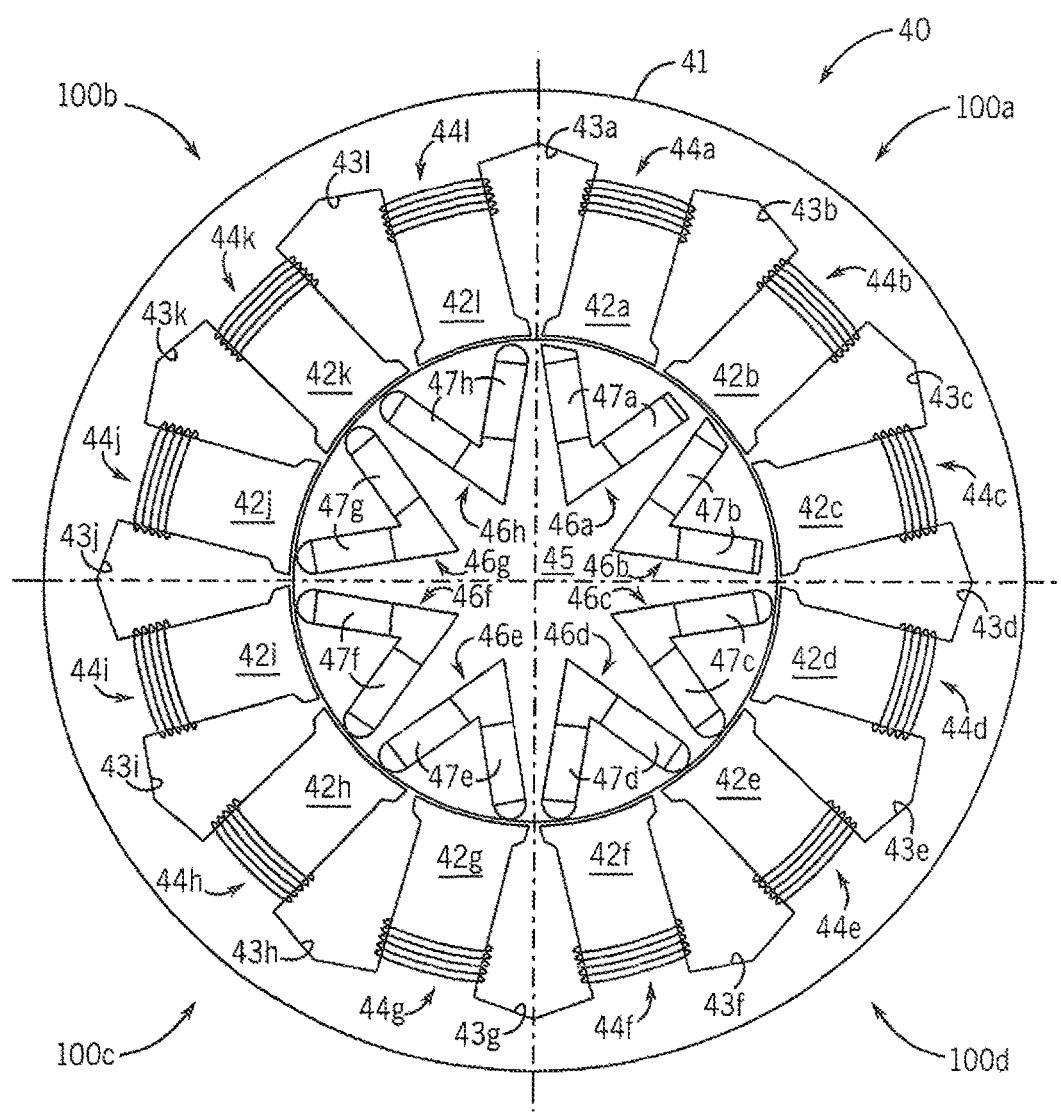
FIG. 8 is a sectional view of a motor according to one embodiment of the invention illustrating an asymmetry in the physical construction of the tangential rib between the magnet slot and the surface of the rotor.
Figure 9:
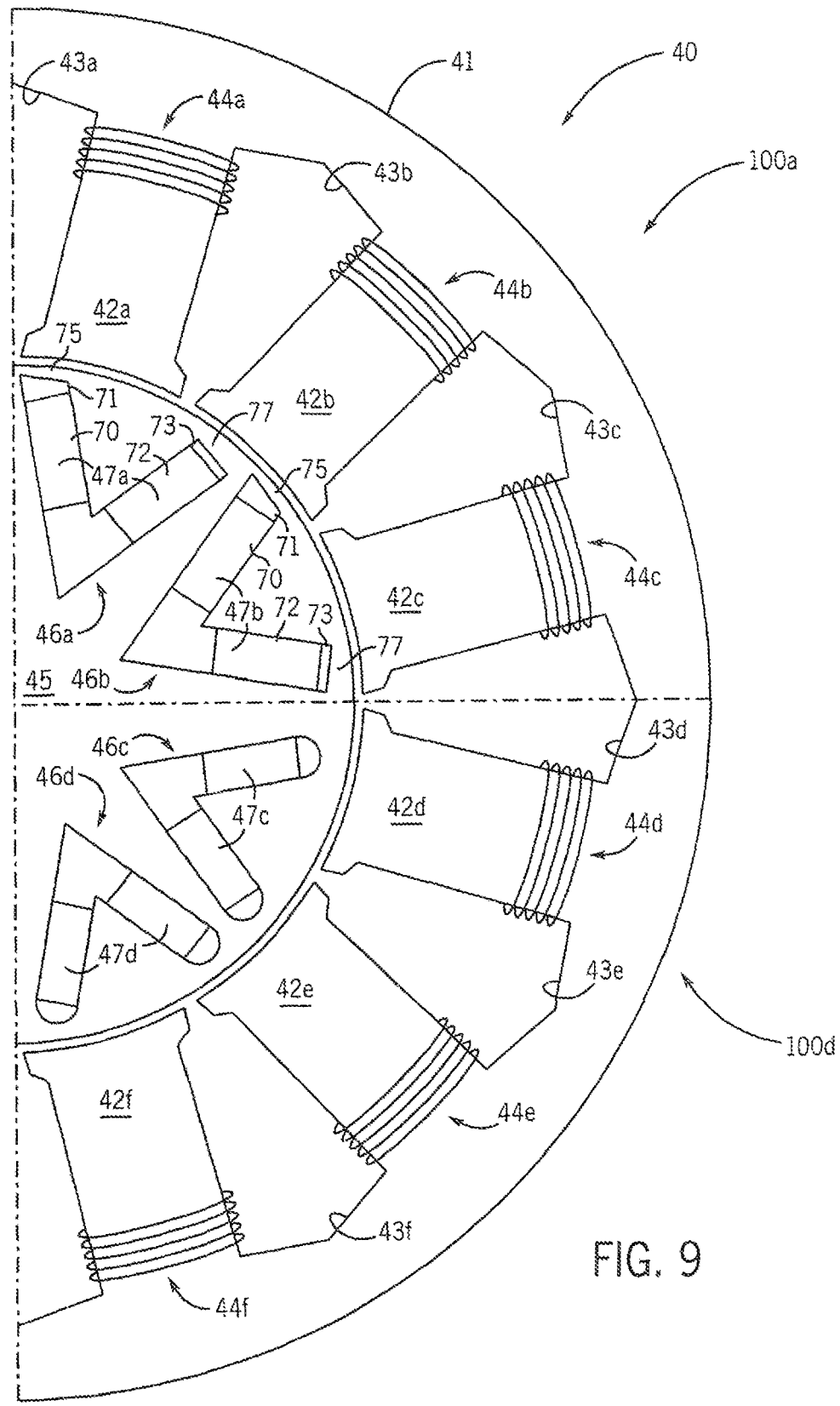
FIG. 9 is a partial sectional view of the motor of FIG. 8.

Turning next to FIGS. 8 and 9, still another embodiment of the PM motor 40 controlled by the motor drive 10 is illustrated. Similar to the other embodiments discussed above, the PM motor 40 includes a rotor 45 having a number of poles 46 and a stator 41 having a number of windings 44. The PM motor 40 is divided into a number of segments 100 as a function of the number of windings 44 and number of poles 46 in the PM motor 40. According to the illustrated embodiment, the PM motor 40 includes twelve windings 44a-44l, eight poles 46a-46h, and is divided into four segments 100a-100d, where each segment 100a-100d includes three windings 44 and two poles 46. Each pole 46 includes a v-shaped slot in which a pair of magnets 47 is inserted, where one magnet of the pair is inserted into each leg of the v-shaped slot.

The asymmetry in the rotor 45 is defined by an asymmetrical design of an individual pole 46. Each pole 46 in the first segment 100a has the same physical construction but also includes an asymmetry in the pole 46. A first end 71 of a first leg 70 of the v-shaped slot has a different shape than a first end 73 of a second leg 72 of the v-shaped slot, where the first ends 71, 73 of the first and second legs 70, 72 are each distal to the point of the v-shaped slot. In other words, the first ends 71, 73 of the first and second legs 70, 72 are proximate the outer periphery of the rotor 45. Each of the first end 71 and the second end 73 are shaped differently such that a first rib 75, formed by the material of the rotor between the first end 71 and the outer periphery of the rotor, is different than a second rib 77, formed by the material of the rotor between the second end 73 and the outer periphery of the rotor. The interaction of each pole 46 with the current in the stator windings of the first segment changes from the interaction of each pole 46 with the current in the stator windings of the other segments as the shape of the first and second ends 71, 73 varies.

Figure 10:
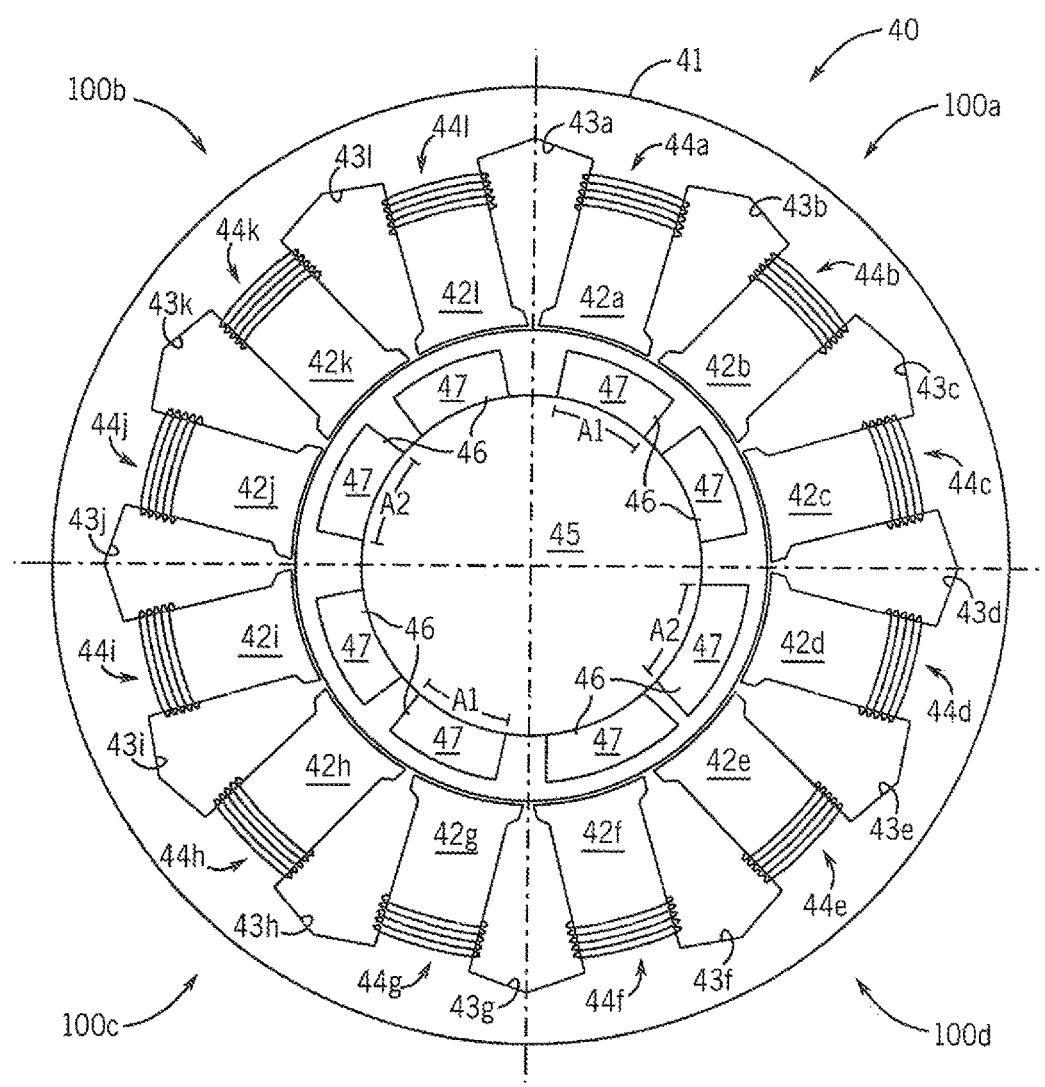
FIG. 10 is a sectional view of a motor according to one embodiment of the invention illustrating an asymmetry in the arc length of a surface magnet of the rotor.
Figure 11:
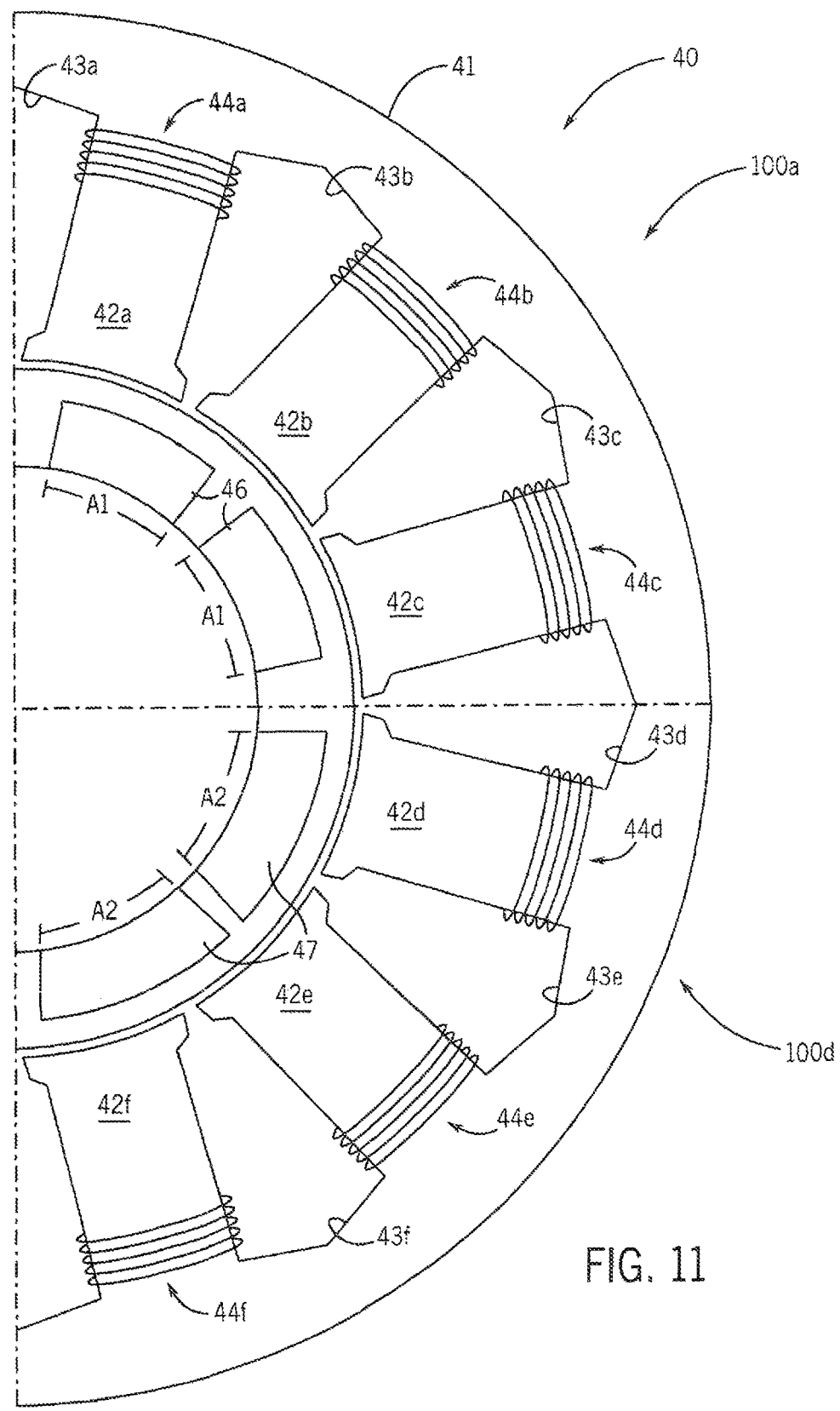
FIG. 11 is a partial sectional view of the motor of FIG. 10.

Turning next to FIGS. 10 and 11, yet another embodiment of the PM motor 40 controlled by the motor drive 10 is illustrated. Similar to the other embodiments discussed above, the PM motor 40 includes a rotor 45 having a number of poles 46 and a stator 41 having a number of windings 44. The PM motor 40 is divided into a number of segments 100 as a function of the number of windings 44 and number of poles 46 in the PM motor 40. According to the illustrated embodiment, the PM motor 40 includes twelve windings 44a-44l, eight poles 46a-46h, and is divided into four segments 100a-100d, where each segment 100a-100d includes three windings 44 and two poles 46. Rather than having slots into which magnets are inserted, the magnets 47 are mounted to the surface of the rotor 45, forming a surface permanent magnet machine.

The asymmetry in the rotor 45 is defined by a variation in the arc length of the magnets 47 for the poles 46 in one of the segments 100. For each pole 46, a magnet 47 spans a certain distance, or arc-length, around the periphery of the rotor 45. According to the illustrated embodiment, the second arc-length, A2, in the fourth segment 100d is different than the first arc-length, A1, in each of the other segments 100a-100c. The interaction of each pole 46 with the current in the stator windings of the fourth segment changes from the interaction of each pole 46 with the current in the stator windings of the other segments as the second arc-length, A2, is varied from the first arc-length, A1.

In operation, the motor drive 10 receives a reference signal, such as a speed reference, position reference, or a torque reference corresponding to desired operation of the PM motor 40 and regulates the amplitude and frequency of current and/or voltage supplied to the PM motor 40 to achieve the desired operation of the PM motor 40. In one embodiment of the invention, the controller 50 includes a current regulator module (not shown) to control the current provided to the PM motor 40. The controller uses the current values measured at the output 35 of the motor drive 10 by the current sensors 54. As is understood in the art, Park's transformation may be used to convert the measured three-phase currents into a two-phase representation of the current along a quadrature axis (q-axis) and along a direct axis (d-axis). The q-axis current corresponds to the amount of torque produced by the PM motor 40 and the d-axis current corresponds to the flux established between the rotor and the stator in the motor. The magnitude of flux is a function of the field strength of the permanent magnets 47, 48 in the rotor 45, of the windings 44 in the stator 41, and of the tooth 42 and/or slot 43 shape in the stator 41.

According to one embodiment of the invention, the windings 44 may be asymmetrically wound such that there is a variation in the magnitude of flux in different segments 100 of the PM motor 40. The variation in the magnitude of flux due to the windings 44 in the stator 41 may be used to determine the absolute mechanical position of the rotor 45. With reference again to FIG. 2, the illustrated PM motor 40 includes three windings 44 in each segment 100. Within each segment 100, each winding has the same number of turns. However, each segment 100 has windings with a different number of turns. In other words, the first segment 100*a* includes windings 44*a*, 44*b*, 44*c* that each have a first number of turns, N1. The second segment 100*b* includes windings 44*d*, 44*e*, 44*f* that each have a second number of turns, N2. The third segment 100*c* includes windings 44*g*, 44*h*, 44*i* that each have a third number of turns, N3. The fourth segment 100*d* includes windings 44*j*, 44*k*, 441 that each have a fourth number of turns, N4. The first number of turns, N1; second number of turns, N2; third number of turns, N3; and the fourth number of turns, N4 are each different. As a result, the flux in the PM motor 40 varies between segments as a function of the number of turns in each segment.

The interaction between the asymmetrical rotor segment and the windings 44 in each segment 100 creates variations in the d-axis current that are distinct for each segment 100. As previously indicated, the flux in the PM motor 40 is a function of the both the field generated by the permanent magnets 47, 48 and the windings 44 in the stator 41. As the rotor 45 turns, the rotor segment with the asymmetry passes each of the different segments 100*a*-100*d* of the stator 41. Even if a constant reference signal is applied to the PM motor 40, such as a constant speed command, and the PM motor 40 is operating at that constant speed, the interaction between the asymmetry in the rotor and the different numbers of turns in the windings 44 within each segment 100 results in a different value of d-axis current as the asymmetry passes each stator segment 100. The controller 50 can monitor the d-axis current and compares the d-axis current to a set of values in a look up table stored in memory 55. The look up table may include a single value of d-axis current for each segment 100, which corresponds to an average value of the d-axis current when the asymmetry is present in the respective segment 100, or, optionally, the look up table may include multiple values of d-axis current for each segment 100, where each value corresponds to a specific angular position (e.g., the asymmetry in the rotor 45 is aligned with one of the teeth 42 in the stator 41) within the segment 100. The controller 50 compares the measured value of the d-axis current to the stored values in the look-up table to determine in which segment the secondary magnets 48 are located.

According to an exemplary embodiment, the first number of turns, N1, in the first segment 100*a* may be eighteen (18) turns per winding 44. The second number of turns, N2, in the second segment 100*b* may be nineteen (19) turns per winding 44. The third number of turns, N3, in the third segment 100*c* may be twenty-one (21) turns per winding 44. The fourth number of turns, N4, in the fourth segment 100*d* may be twenty-two (22) turns per winding 44. The resulting variation in the magnitude of d-axis current between the first segment 100*a* and the fourth segment is less than one percent of the average value of the d-axis current, and the resulting variation in the magnitude of d-axis current between adjacent segments 100 as the rotor 45 rotates within the PM motor is less than one-half of one percent (<0.5%) and may be about one-quarter of one percent (0.25%). The small amplitude of the resulting variation in the peak amplitude of the d-axis current due to the varying number of turns on each winding 44 in the stator 41 and due to the asymmetry in the rotor 45 does not adversely affect the performance of the PM motor 40. Yet, the variation in the peak amplitude of the d-axis current is sufficiently large and repeatable that the controller 50 is able to identify next to which segment 100 of the stator 41 the secondary magnets 48 are aligned.

According to another embodiment of the invention, the shape of the teeth 42 or of the slots 43 in the stator 41 are configured such that there is a variation in the shape in different segments 100 of the PM motor 40. The shape of the teeth 42 and, in particular, the shape of the tooth tip 49, impacts the flux density across the air gap between the rotor 45 and the stator 41. With reference again to FIGS. 4 and 5, the illustrated PM motor 40 has three teeth 42 within each segment 100. The tips 49 of the teeth in the first segment 100*a* have a narrower width than the tips 49 of the teeth in the other segments 100*b*-100*d*. Each of the teeth 42 within any one segment 100 have tooth tips 49 that have the same shape. Although the exemplary embodiment illustrates a different shape for the tooth tips 49 in just one segment 100, it is contemplated that the shape may vary for each segment 100.

As discussed above with respect to varying stator windings, the interaction between the asymmetrical rotor segment and different shapes of the teeth 42 and slots 43 in each segment 100 creates variations in the d-axis current that are distinct for each segment 100. As the rotor 45 turns, the rotor segment with the asymmetry passes each of the different segments 100*a*-100*d* of the stator 41. Even if a constant reference signal is applied to the PM motor 40, such as a constant speed command, and the PM motor 40 is operating at that constant speed, the interaction between the asymmetry in the rotor and the different shapes of the teeth 42 and slots 43 within each segment 100 results in a different flux density and, therefore, a different value of d-axis current as the asymmetry passes each stator segment 100. The controller 50 can monitor the d-axis current and compares the d-axis current to a set of values in a look up table stored in memory 55. The look up table may include a single value of d-axis current for each segment 100, which corresponds to an average value of the d-axis current when the asymmetry is present in the respective segment 100, or, optionally, the look up table may include multiple values of d-axis current for each segment 100, where each value corresponds to a specific angular position (e.g., the asymmetry in the rotor 45 is aligned with one of the teeth 42 in the stator 41) within the segment 100. The controller 50 compares the measured value of the d-axis current to the stored values in the look-up table to determine in which segment the secondary magnets 48 are located.

The controller 50 may use the knowledge of which segment the asymmetry is located to determine an absolute mechanical position of the rotor. As discussed in more detail in U.S. Ser. No. 15/335,552, which is co-owned by the Assignee of this application and the contents of which are incorporated herein by reference, the controller 50 may utilize a sensorless position detection technique to identify an electrical position of the rotor 45 with respect to the stator 41. The electrical position identifies the relationship of the rotor 45 within one segment of the PM motor 40 and, for the illustrated embodiment may be one of four locations. For example, if the controller 50 determines that the rotor 45 is located at one hundred eighty electrical degrees (i.e., the midpoint of one segment), the corresponding mechanical position may be forty-five degrees, one hundred thirty-five degrees, two hundred twenty-five degrees, or three-hundred fifteen degrees. Having the knowledge of which segment the asymmetry in the rotor is located in due to the interaction between the asymmetries in the rotor and stator allow the controller 50 to determine at which of the four potential mechanical positions the rotor 45 is located.

According to another embodiment of the invention, the asymmetry of the rotor 45 may be selected to reduce cogging torque in the PM motor 40. With reference again to FIGS. 6 and 7, a distance (D1 or D2) between the center axis of the rotor 45 and the tip of each v-shaped slot 46 is defined. This distance will be referred to herein as the radial distance of each pole 46. The radial distance, D1, in the first three segments 100a-100c is different than the radial distance, D2, in the fourth segment 100d. Similarly, a distance (D3 or D4) is defined between the tips of adjacent poles 46 within a segment 100. This distance will be referred to herein as the rib distance between each pole. The rib distance, D3, in the first three segments 100a-100c is different than the rib distance, D4, in the fourth segment 100d. The inventors have determined that varying the radial and rib distances will cause the amplitude and phase of ripple torque within the segment 100 to vary as well. The inventors have further determined that the amplitude of the ripple torque is affected more by varying the radial distance than by varying the rib distance. Conversely, the phase of the ripple torque is affected more by varying the rib distance than by varying radial distance.

By selecting appropriate radial distances and rib distances for each segment 100, the PM motor 40 may be configured to have a lower overall ripple torque than a symmetrically designed motor. For example, selecting a higher radial distance increases the magnitude of torque ripple. Thus, if one of the segments 100 is to have an asymmetry in radial distance, it is preferable that the segment with the asymmetry has a greater radial distance than the other segments, such that the overall torque ripple generated by the other segments is less than the torque ripple generated by the asymmetrical segment. In addition, when the torque ripple generated by one segment is out of phase with the torque ripple generated by another segment, at least a portion of the overall torque ripple generated within the motor is cancelled. Therefore, if one of the segments 100 is to have an asymmetry in rib distance, it is preferable to identify a distance for the asymmetrical segment that generates a current contributing to torque ripple that is about one hundred eighty degrees out of phase with the current contributing to torque ripple in the other segments. According to one embodiment, a rib distance about eight times greater in the asymmetrical segment than the rib distance in the other segments reduced the torque ripple from the PM motor 40 about 35%.

With reference again to FIGS. 10 and 11, an asymmetrical design of a surface mount rotor may similarly be used to reduce cogging torque and also to reduce the overall cost of the PM motor 40. Historically, it has been known to utilize pole shaping to reduce cogging torque in a surface PM machine. With pole shaping, an arced magnet is first selected that fits to the outer periphery of the rotor 45. The magnet initially has a uniform thickness across the length of the arc. However, shaping the magnet by removing a portion of the thickness of the magnet toward the end of the magnet and preferably, by gradually increasing the amount of magnetic material removed when moving from the center of the magnet to each end using, for example, a sinusoidal shape for each magnet, reduces cogging torque generated within each segment. However, shaping the magnets causes waste magnetic material and utilizing shaped magnets increases the cost of the PM motor in comparison to utilizing a magnet with a uniform thickness.

An asymmetry may be introduced in one or more segments 100 of the PM motor 40 by varying the arc-length of the magnets 47 in each segment 100. According to the illustrated embodiment, the fourth segment 100d includes magnets 47 having an arc length, A2, greater than the arc length, A1, of the other segments 100a-100c. According to other embodiments, it is contemplated that varying arc-lengths for each segment 100 may be utilized. As the arc-length varies, the phase of current within each segment that contributes to torque ripple varies. Therefore, it is desirable to select an arc length such that the current contributing to torque ripple generated by one segment is about one hundred eighty degrees out of phase with the current contributing to torque ripple generated in the other segments. According to one embodiment, the arc length may be selected such that the fill ratio (i.e., arch length of magnet divided by arc length of entire pole) of one segment is about twenty percent greater than the fill ratio of the other segments. In both asymmetrical embodiments (i.e., varying rib distance for an interior permanent magnet or varying arc length for a surface permanent magnet), the varying phase angle of cogging torque produced by the different segments results in an overall smaller magnitude of cogging torque produced by the motor than for a symmetrical construction. Although the currents generating torque ripple and, therefore, vibration and wear resulting from the generating torque ripple may not be distributed evenly about the machine as a result of an asymmetrical design, the overall torque ripple and, therefore, the overall vibration and wear experienced by the PM motor 40 is reduced.

The disclosed invention has been discussed herein with respect to particular embodiments and/or exemplary embodiments, which are not intended to be limiting. For example, various other configurations of primary magnets 47 and secondary magnets 48 may be utilized to generate an asymmetry in the rotor 45. Different physical construction of the rotor slots and/or magnets utilized on the rotor are contemplated. The number of turns within each segment 100 and the difference in the number of turns between segments 100 may be varied according to a particular machine design. Similarly, different variations in stator tooth 42 shape or combinations of shapes may be utilized. The PM motor 40 may include various numbers of slots 43 in the stator 41 and various numbers of poles 46 in the rotor 45. Different combinations of asymmetries within the rotor and the stator, as discussed herein, may be utilized.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A permanent magnet machine, comprising:
   a stator in the permanent magnet machine having a plurality of windings, wherein each winding includes a plurality of turns of an electrical conductor;
   a rotor in the permanent magnet machine having a plurality of poles, wherein each pole includes a magnetic structure operable to interact with a current conducted in the plurality of windings to cause rotation of the rotor;

a plurality of segments defined within the permanent magnet machine, wherein;

each of the plurality of segments is defined from a center axis of the permanent magnet machine to an outer periphery of the permanent magnet machine and spans an angular distance around the permanent magnet machine equal to an angular distance spanned by each of the other segments, the plurality of windings in the stator are distributed within each of the plurality of segments such that an equal number of windings are located within each of the plurality of segments, the plurality of poles in the rotor are distributed within each of the plurality of segments such that an equal number of poles are located within each of the plurality of segments, each winding, selected from the equal number of windings located within one of the plurality of segments, has an equal number of turns as the other windings within the corresponding segment, and a physical construction of each pole, selected from the equal number of poles located within one of the plurality of segments, is the same;

a first asymmetry located in the rotor, wherein the first asymmetry is defined by a first physical construction of each pole located in a first segment, the first segment selected from the plurality of segments, being different than a second physical construction of the poles in other segments selected from the plurality of segments; and a second asymmetry located in the stator and within one of the plurality of segments of the permanent magnet motor.

2. The permanent magnet machine of claim 1 wherein a number of segments included in the plurality of segments is equal to a greatest common divisor between a number of slots and a number of poles in the permanent magnet machine.

3. The permanent magnet machine of claim 2 wherein:

a first distance is defined between a first pole and a second pole, wherein the first pole and the second pole are selected from the plurality of poles and the first pole and the second pole together define a pole pair, a second distance is defined between the center axis of the permanent magnet machine and the pole pair, the first distance and the second distance for each pole pair within each of the plurality of segments is the same, and the first asymmetry is defined by at least one of the first distance and the second distance within the first segment being different than the first distance and the second distance within each of the other segments.

4. The permanent magnet machine of claim 2 wherein:

each of the plurality of poles includes a magnet spanning a distance around the rotor, the distance for each of the plurality of poles within each of the plurality of segments is the same, the first asymmetry is defined by the distance for each of the plurality of poles within the first segment being different than the distance for each of the plurality of poles within each of the other segments.

5. The permanent magnet machine of claim 3 wherein the pole pairs in each of the plurality of segments includes a primary magnetic structure and the first asymmetry is defined by a secondary magnetic structure included within at least one of the plurality of poles in the first segment.

6. The permanent magnet machine of claim 2 wherein:

the stator includes a plurality of slot openings, each slot opening, selected from the plurality of slot openings, located within one of the plurality segments is identical, each slot opening, selected from the plurality of slot openings, located within a second segment, the second segment selected from the plurality of segments, includes a difference from each slot opening in other segments than the second segment selected from the plurality of segments, and the second asymmetry is defined by the difference in each slot opening in the second segment and each slot opening in the other segments.

7. The permanent magnet machine of claim 2 wherein:

each winding, selected from the plurality of windings, located within one of the plurality segments is identical, each winding, selected from the plurality of windings, located within a second segment, selected from the plurality of segments, includes a difference from each winding, selected from the plurality of windings, located in other segments than the second segment, and the second asymmetry is defined by the difference in each winding in the second segment and each winding in the other segments.

8. The permanent magnet machine of claim 7 wherein the second asymmetry is further defined by a first number of turns for each winding in the second segment being different than a second number of turns for each winding in the other segments.

9. A permanent magnet machine comprising:

a stator in the permanent magnet machine having a plurality of windings;

a rotor in the permanent magnet machine having a plurality of poles;

a plurality of segments defined within the permanent magnet machine, wherein:

a number of segments present in the permanent magnet machine is equal to a greatest common divisor between a number of slots in the stator and a number of poles in the rotor, the plurality of windings in the stator are distributed within each of the plurality of segments such that an equal number of windings are located within each of the plurality of segments, the plurality of poles in the rotor are distributed within each of the plurality of segments such that an equal number of poles are located within each of the plurality of segments, each winding, selected from the equal number of windings located within one of the plurality of segments, is the same as the other windings within the corresponding segment, and each of the poles, selected from the equal number of poles located within one of the plurality of segments, has a physical construction that is the same as the other poles within the corresponding segment;

a first asymmetry located in the rotor; and a second asymmetry located in the stator, wherein:

each winding within a first segment, selected from the plurality of segments, includes a difference from each winding in other segments selected from the plurality of segments, and the second asymmetry is defined by the difference in each winding within the first segment and each winding in the other segments.

10. The permanent magnet machine of claim 9 wherein:
each of the plurality of windings includes a number of turns,
the number of turns for each of the plurality windings located within one segment, selected from the plurality of segments, is the same, and
the second asymmetry is defined by a first number of turns provided for each winding in the first segment being different than a second number of turns provided for each winding in the other segments.

11. The permanent magnet machine of claim 10, wherein the first asymmetry is defined by a first physical construction of each pole in a second segment, selected from the plurality of segments, being different than a second physical construction of each pole in segments other than the second segment.

12. The permanent magnet machine of claim 11 wherein:
a first distance is defined between a first pole and a second pole, wherein the first pole and the second pole are selected from the plurality of poles and the first pole and the second pole together define a pole pair,
a second distance is defined between a center axis of the permanent magnet machine and the pole pair,
the first distance and the second distance for each pole pair within each of the plurality of segments is the same, and
the first asymmetry is defined by at least one of the first distance and the second distance within the second segment being different than the first distance and the second distance within each of the segments other than the second segment.

13. The permanent magnet machine of claim 11 wherein:
each of the plurality of poles includes a magnet spanning a distance around the rotor,
the distance for each of the plurality of poles within each of the plurality of segments is the same,
the first asymmetry is defined by the distance for each of the plurality of poles within the second segment being different than the distance for each of the plurality of poles within each of the other segments.

14. The permanent magnet machine of claim 12 wherein the pole pairs in each of the plurality of segments includes a primary magnetic structure and the first asymmetry is defined by a secondary magnetic structure included within at least one of the plurality of poles in the second segment.

15. A permanent magnet machine, comprising:
a stator in the permanent magnet machine having a plurality of windings;
a rotor in the permanent magnet machine having a plurality of poles;
a plurality of segments defined within the permanent magnet machine, wherein:
a number of segments present in the permanent magnet machine is equal to a greatest common divisor between a number of slots in the stator and a number of poles in the rotor,
the plurality of windings in the stator are distributed within each of the plurality of segments such that an equal number of windings are located within each of the plurality of segments,
the plurality of poles in the rotor are distributed within each of the plurality of segments such that an equal number of poles are located within each of the plurality of segments,
each winding, selected from the equal number of windings located within one of the plurality of segments, is the same as the other windings within the corresponding segment, and
each of the poles, selected from the equal number of poles located within one of the plurality of segments, has a physical construction that is the same as the other poles within the corresponding segment; and
an asymmetry located in the rotor, wherein the physical construction of the poles within a first segment, selected from the plurality of segments, is different than the physical construction of the poles in other segments, selected from the plurality of segments, and the asymmetry is defined by the physical construction of the poles within the first segment.

16. The permanent magnet machine of claim 15 wherein:
each of the plurality of windings includes a number of turns,
the number of turns for each of the plurality windings located within one segment, selected from the plurality of segments, is the same, and
a second asymmetry, located in the stator, is defined by a first number of turns provided for each winding in the first segment being different than a second number of turns provided for each winding in the other segments.

17. The permanent magnet machine of claim 15 wherein:
the stator includes a plurality of slot openings,
each slot opening, selected from the plurality of slot openings, within one of the plurality segments is identical,
each slot opening, selected from the plurality of slot openings, within a first segment, selected from the plurality of segments, includes a difference from each of the slot openings in the other segments, and
a second asymmetry, located in the stator, is defined by a difference in each slot opening in the first segment and the slot openings in the other segments.

18. The permanent magnet machine of claim 15 wherein:
a first distance is defined between a first pole and a second pole,
the first pole and the second pole are selected from the plurality of poles
the first pole and the second pole define a pole pair,
a second distance is defined between a center axis of the permanent magnet machine and the pole pair,
the first distance for each pole pair within each of the plurality of segments is the same,
the second distance for each pole pair within each of the plurality of segments is the same, and
the first asymmetry is defined by at least one of the first distance and the second distance within the first segment being different than the first distance and the second distance within each of the other segments.

19. The permanent magnet machine of claim 15 wherein:
each of the plurality of poles includes a magnet spanning a distance around the rotor,
the distance for each of the plurality of poles within each of the plurality of segments is the same,
the first asymmetry is defined by a first distance for each of the plurality of poles within the first segment being different than a second distance for each of the plurality of poles within each of the other segments.

20. The permanent magnet machine of claim 18 wherein each of the pole pairs in each of the plurality of segments includes a primary magnetic structure and the first asymmetry is defined by a secondary magnetic structure included within at least one pole in the first segment.

* * * * *